US012607520B1

(12) United States Patent　　　　　(10) Patent No.:　US 12,607,520 B1
Gelbart et al.　　　　　　　　　　　(45) Date of Patent:　　　Apr. 21, 2026

(54) TEMPERATURE SENSOR FOR HIGH-TEMPERATURE APPLICATIONS

(71) Applicant: 2422353 Ontario Limited, Hampton (CA)

(72) Inventors: Daniel Gelbart, Vancouver (CA); Wayne Ernest Conrad, Hampton (CA)

(73) Assignee: 2422353 Ontario Limited, Hampton (CA)

( * ) Notice: Subject to any disclaimer, the term of this patent is extended or adjusted under 35 U.S.C. 154(b) by 0 days.

(21) Appl. No.: 19/208,939

(22) Filed: May 15, 2025

(51) Int. Cl.
　　*G01K 7/16*　　　(2006.01)
　　*G01K 15/00*　　 (2006.01)
(52) U.S. Cl.
　　CPC ............. *G01K 7/16* (2013.01); *G01K 15/005* (2013.01)
(58) Field of Classification Search
　　CPC ............................... G01K 7/16; G01K 15/005
　　See application file for complete search history.

(56) References Cited

U.S. PATENT DOCUMENTS

| | | | | |
|---|---|---|---|---|
| 7,569,798 | B2 * | 8/2009 | Thimm | H05B 3/746 219/460.1 |
| 11,450,428 | B2 * | 9/2022 | Soreefan | G01J 5/0025 |
| 2022/0096012 | A1 * | 3/2022 | Cross | A61B 5/01 |

FOREIGN PATENT DOCUMENTS

CA　　　2749472 A1 *　7/2010　............ H05B 45/56

OTHER PUBLICATIONS

Ho et al., "Electrical resistance drift of molybdenum silicide thin film temperature sensors", Nov. 1994, Elsevier Publication, pp. 232-238. (Year: 1994).*
Abstract—Prakash, S. et al.: "Thin film molybdenum silicide as potential temperature sensors for turbine engines", Proceedings of the 16th International Conference, San Diego, CA, Apr. 17-21, 1989. vol. 1 (A91-41501 17-23). London and New York, Elsevier Applied Science, 1989, p. 79-87.; retrievable at: https://ntrs.nasa. gov/citations/19910056883.
Abstract—C.H. Ho, S. Prakash, H.J. Doerr, C.V. Deshpandey, R.F. Bunshah "Oxidation of molybdenum silicide thin film temperature sensors", Thin Solid Films, vol. 207, Issues 1-2, Jan. 30, 1992, pp. 294-301; retrievable at https://www.sciencedirect.com/science/article/ abs/pii/0040609092901141W.

* cited by examiner

*Primary Examiner* — Elias Desta
(74) *Attorney, Agent, or Firm* — Philip C. Mendes da Costa; SMART & BIGGAR LP

(57)　　　　　　ABSTRACT

A temperature sensing system using a molybdenum disilicide ($MoSi_2$) sensing element. The $MoSi_2$ sensing element can be positioned at a sensing location and the resistance of the sensing element can be detected and converted into temperature value representing the temperature at the sensing location. The sensing system can be used to provide temperature sensing in environments experiencing very high temperatures (e.g. greater than 1,200° C.) with low-cost sensing elements. The sensing system can also provide accurate temperature sensing across a large range of temperatures.

20 Claims, 4 Drawing Sheets

300

310
APPLY SENSE CURRENT

320
DETERMINE RESISTANCE OF SENSING ELEMENT

330
DETERMINE TEMPERATURE AT THE SENSING LOCATION

TEMPERATURE SENSOR FOR HIGH-TEMPERATURE APPLICATIONS

FIELD

This disclosure relates generally to temperature sensors, and in particular temperature sensors for use in high-temperature applications.

INTRODUCTION

The following is not an admission that anything discussed below is part of the prior art or part of the common general knowledge of a person skilled in the art.

Temperature sensors are used to detect and monitor the temperature at a sensing location for a variety of applications. Temperature sensors face challenges when operating in locations that experience a wide range of temperatures and/or experience extreme temperatures. Many such temperature sensors require the use of complex sensing systems and/or expensive sensing elements.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In one aspect of this disclosure, which may be used by itself or with one or more of the other aspects disclosed herein, there is provided a temperature sensing system using a molybdenum di-silicide (MoSi$_2$) sensing element. The MoSi$_2$ sensing element is useable as a thermocouple and can be positioned at a sensing location and the resistance of the sensing element can be detected and converted into a temperature value representing the temperature at the sensing location. The sensing system can be used to provide temperature sensing in environments experiencing very high temperatures (e.g. greater than 1,200° C., 1,400° C., 1,600° C., 1,800° C. or higher) with low-cost sensing elements. The sensing system can also provide accurate temperature sensing across a large range of temperatures.

The temperature sensing system can operate with a pulsed sense current used to measure the resistance of the sensing element. This may enable the system to use a higher current level to detect small changes in the resistance of the sensing elements. This can provide a more sensitive temperature sensor while minimizing self-heating of the sensing element.

In accordance with this aspect, there is provided a temperature sensor system comprising: a molybdenum di-silicide sensing element positionable at a sensing location; a current source electrically connected to the sensing element; and a controller configured to control a sense current output by the current source and to determine a temperature at the sensing location based on a resistance of the sensing element in response to the sense current.

The controller can be configured to define the sense current output as a sense current pulse.

The controller can be configured to cause the current source to emit the sense current pulse with a pulse frequency in a range between one pulse per minute to 20 pulses per minute.

The system can include a voltage sensor coupled across the sensing element, and the controller can be configured to determine the resistance of the sensing element based on a measured sensing element voltage detected by the voltage sensor.

The system can include a current sensor operable to detect a current level of the sense current passing through the sensing element, and the controller can be configured to determine the resistance of the sensing element based on the sensing element voltage drop and the current level.

The sensing element can include a sensing element input and a sensing element output; the sensing element input can be coupled to a first input terminal and a second input terminal, the first input terminal can be coupled to the current source and the second input terminal can be coupled to a first voltage sensor terminal of the voltage sensor; and the sensing element output can be coupled to a first output terminal and a second output terminal, the first output terminal can be coupled to the current source and the second output terminal can be coupled to a second voltage sensor terminal of the voltage sensor.

The controller can be configured to determine the temperature based on a ratio of the resistance of the sensing element in response to the sense current and a calibration sensing element resistance.

The calibration sensing element resistance can be determined by applying a calibration sense current pulse to the sensing element while the sensing element is maintained at a calibration temperature.

The calibration sensing element resistance can be determined during installation of the sensing element at the sensing location.

In accordance with this aspect, there is also provided a temperature sensing method comprising: applying a sense current to a Molybdenum Di-Silicide sensing element positioned at a sensing location; determining a measured sensing element resistance of the sensing element in response to the sense current; and determine a temperature at the sensing location based on the determined voltage.

Applying the sense current can include emitting a sense current pulse.

The sense current pulse can be applied with a pulse frequency in a range between one pulse per minute to 20 pulses per minute.

The temperature can be determined based on a ratio of the measured sensing element resistance and a calibration sensing element resistance.

The calibration sensing element resistance can be determined by applying a calibration sense current pulse to the sensing element while the sensing element is maintained at a calibration temperature.

The calibration sensing element resistance can be determined during installation of the sensing element at the sensing location.

It will be appreciated by a person skilled in the art that a system, apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
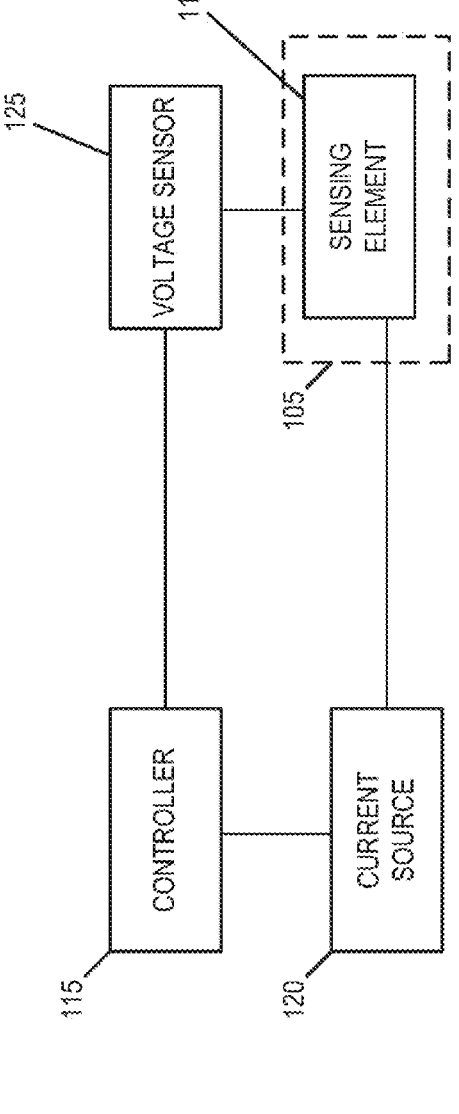
FIG. 1 is a schematic illustration of an example temperature sensing system.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatuses will be described below to provide an example of an embodiment of each claimed invention. No embodiment described below limits any claimed invention and any claimed invention may cover apparatuses that differ from those described below. The claimed inventions are not limited to apparatuses having all of the features of any one apparatus described below or to features common to multiple or all of the apparatuses described below. It is possible that an apparatus described below is not an embodiment of any claimed invention. Any invention disclosed in an apparatus described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment", "embodiment", "embodiments", "the embodiment", "the embodiments", "one or more embodiments", "some embodiments", and "one embodiment" mean "one or more (but not all) embodiments of the present invention(s)," unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Some elements herein may be identified by a part number, which is composed of a base number followed by an alphabetical or subscript-numerical suffix (e.g., $112_a$, or $112_1$). Multiple elements herein may be identified by part numbers that share a base number in common and that differ by their suffixes (e.g., $112_1$, $112_2$, and $112_3$). All elements with a common base number may be referred to collectively or generically using the base number without a suffix (e.g., 112).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Temperature sensors for high-temperature applications such as furnaces operating, e.g., above about greater than 1,200° C., 1,400° C., 1,600° C., 1,800° C. or higher face a variety of challenges. Many high-accuracy temperature sensors for high-temperature applications use platinum thermocouples or resistors. These sensors systems are often quite expensive due to the high cost of platinum.

Existing temperature sensors for high-temperature applications often operate with low output levels. As a result, specialized signal processing electronics are required to detect the temperature signals from the sensing elements. This further increases the cost and complexity of these temperature sensing system.

The present application provides temperature sensing systems and methods that may address challenges with existing temperature sensing systems, in particular for high-temperature applications. The systems and methods described herein include a molybdenum di-silicide (also referred to herein as $MoSi_2$) sensing element. It has been determined that $MoSi_2$ sensing elements can operate as accurate temperature sensors across a large range of temperatures, e.g. from room temperature to over 1800° C. Such sensing elements may comprise, consist essentially of or consist of $MoSi_2$. Any known $MoSi_2$ heating element may be used as a sensing element.

The use of a $MoSi_2$ sensing element can significantly reduce the cost of the temperature sensing system as compared to platinum-based systems (e.g. $MoSi_2$ based temperature sensors cost about 1/10 of platinum-based sensors). $MoSi_2$ sensing elements also tend to be quite robust as they are resistant to scratches and deposits when in the presence of contaminants. This can extend the lifespan and increase the reliability of a temperature sensing systems.

Temperature sensing systems using $MoSi_2$ sensing elements can also reduce or eliminate the need for low-level signal processing. Instead, the signal output levels from the sensing element can be increased to facilitate accurate temperature sensing.

Referring now to FIG. 1, shown therein is an example temperature sensing system 100. The example temperature sensing system 100 can be used to sense the temperature within a sensing region 105. The sensing region 105 may correspond to a region or location where the temperature is to be measured. The sensing region 105 may be positioned within a high-temperature location or chamber, such as the interior of an oven or furnace for example, e.g., a vapour deposition oven, or kilns to fire ceramics.

The temperature sensing system 100 generally includes a sensing element 110 that is positionable within a sensing region 105. The temperature sensing system 100 can also include a controller 115, a current source 120, and a voltage sensor 125 as shown in the example of FIG. 1.

The sensing element 110 is generally a device or material that enables the temperature within the sensing region 105 to be determined based on changes in the electrical properties of the sensing element 110. The sensing element 110 can be formed of molybdenum di-silicide ($MoSi_2$) as discussed previously.

The current source 120 can be electrically connected to the sensing element 110. The current source 120 can be configured to drive a sensing current through the sensing element 110.

The voltage sensor 125 can be electrically coupled across the sensing element 110. The voltage sensor 125 can be configured to measure the voltage drop across the sensing element 110. For example, the voltage sensor 125 may detect or measure the voltage drop across the sensing element 110 in response to the sensing current from the current source 120.

The controller 115 can be configured to control the operation of the temperature sensing system 100. The controller 115 can also be configured to determine the temperature in the sensing location 105 based on electrical signals received from the components of system 100 such as the sensing element 110 and/or voltage sensor 125.

The controller 115 can be configured to control the sense current output by the current source 120. That is, the controller 115 can transmit signals to the current source 120 to control the operation of the current source 120 and thereby the sense current. The controller 115 can be configured to adjust various properties of the sense current, such as the sense current level, sense current frequency, sense current type (e.g. pulsed or continuous pulse current signal), etc.

Optionally, the current source 120 may be configured (e.g. by the controller 115) to emit the sense current as a pulsed sense current. That is, the sense current may be emitted on an intermittent basis (e.g. at regular periodic intervals) to interrogate the temperature within the sensing region 105.

For many applications, the temperature within the sensing region 105 changes slowly and thus measuring the temperature on an intermittent basis is sufficient to provide accurate monitoring of the sensing region temperature. The frequency of emission for a pulsed sense current can vary between applications and/or implementations of the system 100. For instance, the sense current pulse may be output with a frequency between about once a second to once a minute. For some applications, a pulsed sense current output frequency between about 1 time per minute to about 20 times a minute can be sufficient.

The use of a pulse sensed current may also allow the sense current level to be increased (i.e. a higher sense current can be used) without causing self-heating of the sensing element 110. This can further improve the accuracy of the sensing system 100 by enabling smaller variations in the sensing element resistance (and therefore the temperature) to be detected.

Alternatively, the current source 120 may be configured (e.g. by the controller 115) to output a continuous sense current. This may allow the temperature sensing system 100 to detect temperature changes in the sensing region 105 almost immediately once they have occurred. This may be particularly useful for applications where more rapid changes in temperature are expected within the sensing region 105 and/or where small or rapid changes within the sensing region 105 are likely to require more immediate intervention.

The controller 115 can also be configured to determine a temperature at the sensing location 105 based on a resistance of the sensing element 110 in response to the sense current from the current source 120. For example, the controller 115 may determine the resistance of the sensing element 110 based on the measured voltage across the sensing element 110 from the voltage sensor 125. The resistance of the sensing element 110 may then be determined based on the current flowing through the sensing element 110, e.g. based on the sense current emitted from the current source 120 and/or based on a measure current flowing through the sensing element 110.

The controller 115 generally includes a processor in communication with a memory, a communication module, and a user interface.

The processor may be configured to execute a plurality of instructions to control and operate the various components of the controller 115. The processor may also be configured to receive information from the various components of controller 115 and to make specific determinations using this information. The determinations may then be transmitted to the memory device and/or the communication module and/or the user interface.

For example, processor may also be configured to transmit instructions to the current source 120 to generate and emit a sensing current. The processor may also be configured to transmit instructions to adjust an operational mode of the current source 120. For example, the processor may be configured to transmit instructions to adjust the sensing current level and/or the frequency of a sensing current pulse emission.

The processor may be configured to receive information from one or more sensors such as the voltage sensor 125. For example, the processor may be configured to receive voltage readings from the voltage sensor 125. The processor may then determine the resistance of the sensing element 110 within the sensing location 105 based on the level of the sensing current from the current source 120.

Optionally, the processor may be configured to receive information from a current sensor. For example, the processor may be configured to receive current readings from the current sensor indicating the level of current flowing through the sensing element circuit. The processor may then determine the resistance of the sensing element 110 within the sensing location 105 based on the voltage readings from the voltage sensor 125 and the current readings from the current sensor indicating the level of the sensing current from the current source 120. Alternatively, the level of the sensing current may be determined based on the set values of the current source 120.

Optionally, the instructions which are executed by the processor may be transmitted from a remote terminal or other processing device (e.g. a computer, tablet or smartphone communicatively coupled to processor either directly and/or through network and/or a cloud computing platform), and received by the processor via the communication module. Alternatively or in addition, the processor may be pre-configured with specific instructions. The pre-configured instructions may be executed in response to specific events or specific sequences of events, or at specific time intervals.

The memory may be, for example, a non-volatile read-write memory which stores computer-executable instructions and data, and a volatile memory (e.g., random access memory) that may be used as a working memory by the processor. Alternatively or in addition, the memory may be used to store determinations made by the processor in respect of the resistance of the sensing element 110 and/or the temperature within the sensing region 105.

The memory may also store various operational and calibration data for the system 100. For example, the memory may store a calibration sensing element resistance for the sensing element 110. The calibration sensing element resistance may be used by the processor to determine the temperature of the sensing location 105 based on the detected resistance of the sensing element 110 in operation.

Communication module may be configured to send and receive data, or information, to various components of the temperature sensing system 100. For example, the communication module may receive data from one or more sensors, such as a voltage sensor and/or current sensor of the system 100.

The communication module may be configured to transmit instructions to the current source 120. Accordingly, the communication module can be configured to provide two-way bi-directional communication.

Optionally, the communication module may be configured to send and receive data to a remote terminal and/or the user interface. For example, the communication module may transmit to the remote terminal the resistance of the sensing element 110 (or the corresponding temperature value) in response to an applied sensing current. This information may be transmitted in real-time, or near-real time, to allow an operator of the remote terminal to monitor the temperature within the sensing region 105.

The communication module may also receive instructions from a remote terminal and/or user interface. For example, an operator of the remote terminal (or user interface) may transmit instructions to modify the level or frequency of the sense current output by the current source 120.

The communication module may, for example, include a wireless transmitter or transceiver and antenna. Alternatively or in addition, the communication module may be configured for wired communication. Optionally, the communication module may be configured for communication over public or private wired or wireless networks.

The controller 115 may also include a user interface. The user interface may be one or more device that allows a user, or operator, to interact with the controller 115. For example, the user interface may have a keyboard or other input device that allows a user to input instructions into the controller 115 with respect to the operation of the temperature sensing system 100. For example, in some cases, the user may input instructions to control the level or frequency of the sense current output by the current source 120. Accordingly, the user interface may allow direct control of the system 100 without requiring a remote terminal.

Optionally, the user interface may also include a display that allows the user to view the determined resistance response of the sensing element 110 (or the associated temperature value) in response to the sense current from the current source 120. The display may allow the user to view the temperature of the sensing region 105 in real-time, or near real time. The user interface may further include a graphical user interface (GUI) which facilitates user interaction.

Optionally, the controller 115 may also be configured to control the operation of the system in which the sensing location is positioned. For example, the controller 115 may be configured to control the operation of an oven or furnace within which the sensing element 110 is positioned. The controller 115 can use the measured temperature data from the sensing element 110 to control and/or adjust the operation of the corresponding system.

Figure 2:
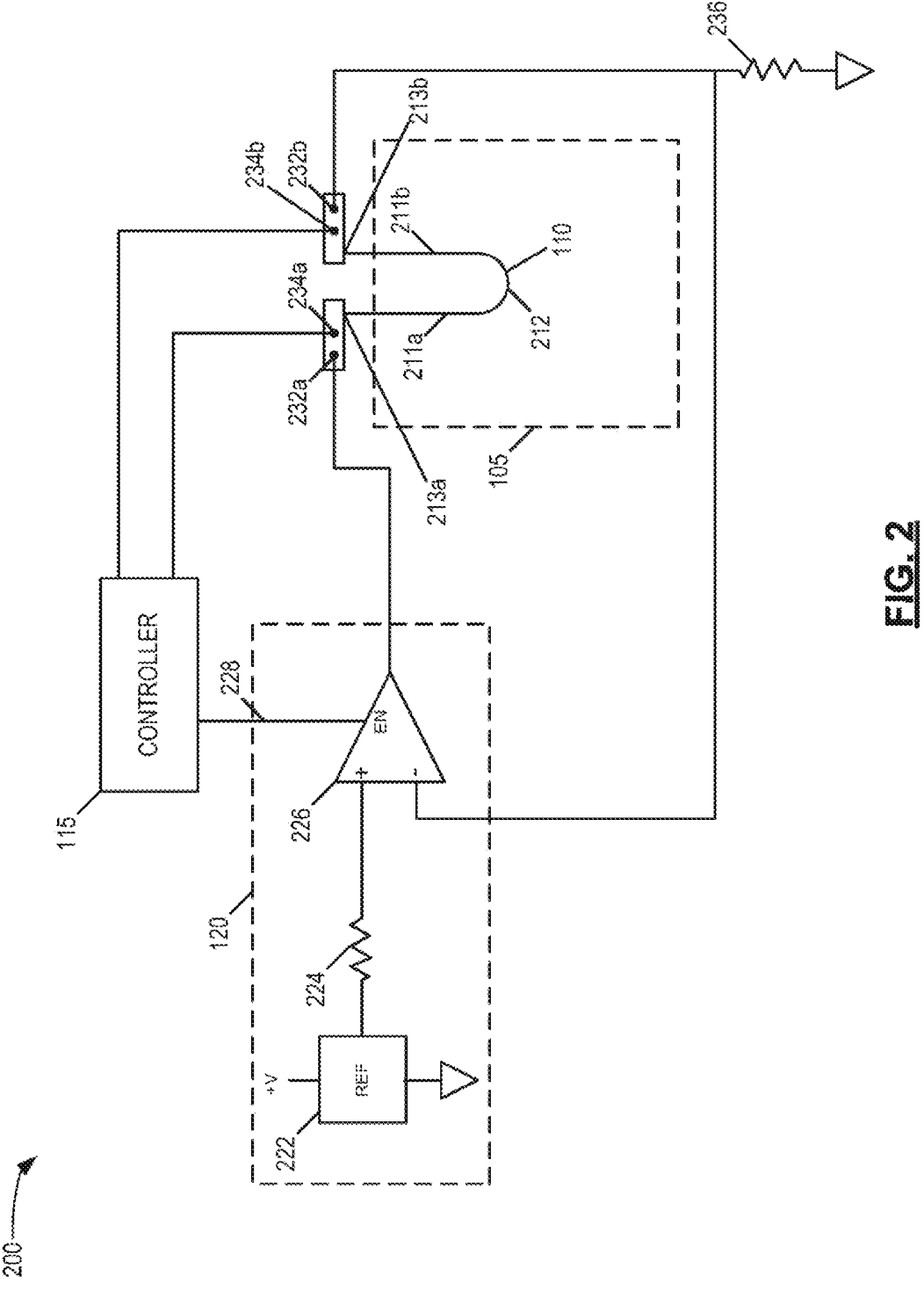
FIG. 2 is a schematic illustration of an example circuit for a temperature sensing system.

Referring now to FIG. 2, shown therein is a circuit diagram 200 of an example temperature sensing system that may be used, for example, as the temperature sensing system 100. As shown in FIG. 2, the temperature sensing system 100 includes a sensing element 110 positioned within a sensing region 105.

As explained with reference to FIG. 1, the sensing element 110 can be provided using a $MoSi_2$ element. Optionally, a $MoSi_2$ heating element can be used as the sensing element 110. $MoSi_2$ heating elements are used as resistive heating elements for various high-temperature applications such as within high-temperature furnaces.

Figure 4:
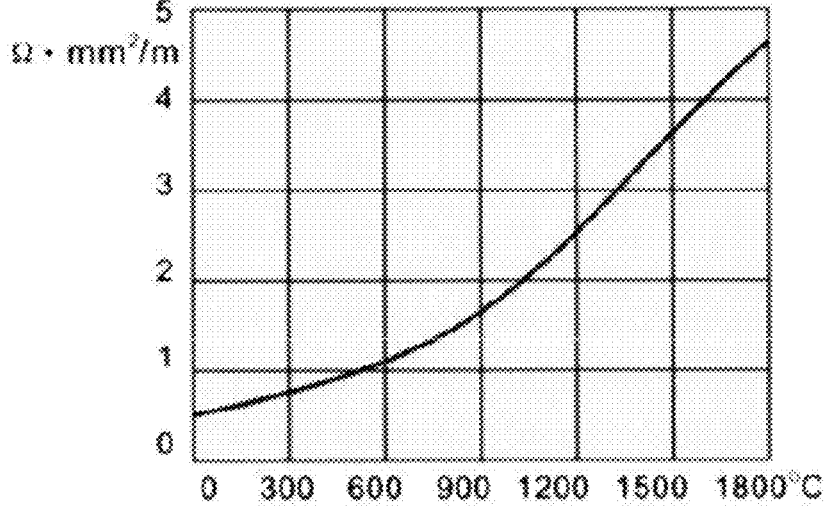
FIG. 4 is a plot of resistance vs. temperature for an example sensing element.

FIG. 4 illustrates an example plot of the resistivity vs. temperature for a $MoSi_2$ sensing element. As illustrated in FIG. 4, $MoSi_2$ experiences a large change in resistance as the temperature changes. That is, the resistance of a $MoSi_2$ element is strongly correlated with the temperature experienced by the sensing element. For example, a $MoSi_2$ sensing element can have a sensing element resistance of less than 10 milli-Ohm at standard room temperatures (e.g. approximately 20° C.) and a sensing element resistance of about 100 milli-Ohm at 1800° C.

The substantial change in the resistivity of a $MoSi_2$ element introduces control challenges when $MoSi_2$ is used as a heating element. However, the inventors have found that the change in resistivity provides advantages for temperature sensing applications, particularly for applications that may experience high temperatures.

Referring again to FIG. 2, the example $MoSi_2$ sensing element 110 is shown as a U-shaped sensing element. Various alternative shapes of sensing elements may be used, such as straight sensing elements, wave-like sensing elements, L-shaped sensing elements, spiral sensing elements and so forth depending on the application and installation requirements.

As shown in FIG. 2, the U-shaped sensing element has a pair of straight leg sections 211a and 211b and a curved section 212 connecting the leg sections 211a and 211b. The U-shaped sensing element 110 may enable more accurate temperature sensing by providing increased surface area for heat transfer with the curved section 212 allowing for a higher temperature gradient as it can change temperature more rapidly than the straight sections 211. The pair of straight sections 211, meanwhile, can facilitate installation and replacement of the sensing element 110.

The sensing element 110 may preferably be installed within the sensing region 105 in a vertical orientation. This may avoid or minimize deflection of the sensing element 110 when experiencing high temperatures.

In the example shown in FIG. 2, a four-terminal sensing method is used to monitor the sensing element 110. This can improve the accuracy of the sensing system 100 by allowing small resistances to be accurately measured. In the four-terminal configuration illustrated, the current supply to the sensing element 110 is provided using a first pair of terminals 232a and 232b while a separate pair of terminals 234a and 234b are coupled to a voltage sensor (included within controller 115 in the example illustrated) used to measure the voltage drop across the sensing element 110. This configuration can help minimize the voltage drop in the leads connected to the sensing element 110 can thus provide a more accurate reading of the voltage drop of the sensing element 110 (and in turn the resistance of the sensing element 110).

As shown in FIG. 2, the sensing element 110 can include a sensing element input 213a and a sensing element output 213b. The sensing element input 213a can be coupled to a pair of separate input terminals including the first input terminal 232a and the second input terminal 234a. Similarly, the sensing element output 213b can be coupled to a pair of separate output terminals including the first output terminal 232b and a second output terminal 234b.

The first input terminal 232a and first output terminal 232b can electrically couple the sensing element 110 to a first electrical loop while the second input terminal 234a and second output terminal 234b can electrically couple the sensing element 110 to a second (separate) electrical loop. The first electrical loop can couple the sensing element 110 to the current source 120 while the second electrical loop can separately couple the sensing element to a voltage sensor.

As shown in FIG. 2, the first input terminal 232a can be coupled to the current source 120 and the first output terminal 232b can be coupled to the current source 120 thereby defining the first electrical loop. The second input terminal 234a can be coupled to a first voltage sensor terminal of the voltage sensor and the second output terminal 234b can be coupled to a second voltage sensor terminal of the voltage sensor thereby defining the second electrical loop.

Optionally, the controller 115 can be electrically connected to a voltage sensor. Alternatively, the voltage sensor can be integrated or combined with the controller 115 as in the example shown in FIG. 2.

The voltage sensor can be coupled to terminals 234a and 234b that are, in turn, connected to the sensing element 110. The voltage sensor can be coupled across the sensing element 110 via the second input terminal 234a and the second output terminal 234b. The controller 115 can be configured to determine the resistance of the sensing element 110 based on a measured sensing element voltage detected by the voltage sensor.

The controller 115 is also electrically connected to the current source 120. The controller 115 can be configured to transmit control signals 228 to the current source 120 to control the operation of the current source.

In the example illustrated, the current source 120 is configured as a constant current source that is enabled by signals 228 from the controller 115 to provide a sense current to the sensing element 110. The current source 120 can include a voltage reference 222 provided by a voltage regulator such as a standard 3 pin analog voltage regulator for example. The voltage reference 222 can be converted into a current reference by resistor 224 which is arranged in series between the voltage reference 222 and the non-inverting input of an operational amplifier 226.

The output of the operational amplifier 226 defines the output of the current source 120 and is electrically connected to the first input terminal 232a. The inverting input of the operational amplifier is electrically connected to the first output terminal 232b to complete the sense current circuit through the sensing element 110. The sense current is output from the operational amplifier 226 to interrogate the sensing element 110.

The operational amplifier 226 also includes a control signal input or enable port. The current source 120 can be enabled by the control signals 228 transmitted from the controller 115 to the operational amplifier 226 to enable the sense current to be output to terminal 232a. As described herein above, the controller 115 may be configured to periodically enable the operational amplifier 226 to output a pulsed sense current.

The temperature sensing system may also include a current sensor operable to detect a current level of the sense current passing through the sensing element 110. The controller 115 may then determine the resistance of the sensing element 110 (and in turn the temperature of sensing region 105) based on the sensing element voltage drop (measured by the voltage sensor) and the current level (measured by the current sensor).

As an example, the current level of the sense current can be detected using a low value resistor 236. The resistance of the current sensing resistor may be in the range of about 1 milli-Ohm to 100 milli-Ohm.

Alternatively, the current sensor may be omitted or may be included as part of the current source 120. The resistance of the sensing element 110 may then be determined based on the current level output from the current source 120.

Figure 3:
FIG. 3 is a flowchart of an example temperature sensing method.
Figure 3:
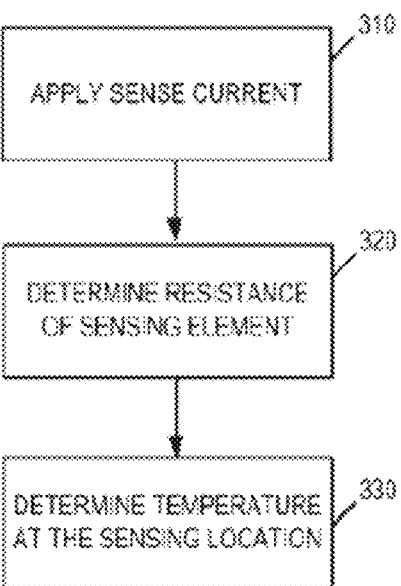

Referring now to FIG. 3, shown therein is a flowchart of an example temperature sensing method 300. The temperature sensing method 300 is an example of a method of sensing the temperature within a sensing region using a temperature sensing system with a sensing element formed from molybdenum di-silicide such as the example systems 100 and 200 described herein.

At 310, a sense current can be applied to a molybdenum di-silicide sensing element positioned at a sensing location. The sensing element can be positioned at a location where temperature monitoring is desired, such as the interior of an oven or furnace for example.

The sense current can be output by a current source electrically connected to the sensing element. The current source can be configured to generate the sense current to enable the resistance of the sensing element to be determined based on a voltage drop across the sensing element. The level of the sense current can thus be set to enable changes in the resistance to be accurately detected, even when those changes are small.

Optionally the sense current can be output as a sense current pulse. Using a sense current pulse can allow a higher sense current level to be used without causing self-heating of the sensing element. This may facilitate the detection of small changes in the resistance of the sensing element.

For example, a $MoSi_2$ sensing element with a 6 mm diameter active section may be expected to have a sensing element resistance of about 4 milli-Ohm at room temperature and a resistance of about 30 milli-Ohm at 1400 degrees C. With a 10 A sense current pulse, the detected voltage drop across the sensing element would be about 40 mV at room temperature and about 300 mV at 1400 degrees C.

The frequency of emission for a pulsed sense current can vary between applications and/or implementations of the system 100. The controller 115 can be configured to emit the sense current pulse with a desired frequency depending on the application and/or operational requirements. For instance, the sense current pulse may be output with a frequency between about once a second to once a minute.

A pulsed sense current may be particularly suited to applications where the temperature variations of interest occur slowly and gradually over time. For example, the temperature inside a furnace can change slowly and measuring the temperature between 1 time to 20 times a minute is sufficient for most applications. Accordingly, the sense current pulse can be applied with a pulse frequency in a range between one (1) pulse per minute to twenty (20) pulses per minute.

Alternatively, the sense current may be output continuously. This may allow changes in the resistance of the sensing element (and thus the temperature of the sensing region) to be detected almost instantaneously as they occur.

The sense current level can be defined to enable changes in the resistance to be accurately detected, even when those changes are small. At the same time, the sense current level can be selected to minimize the sensing error that may be caused by self-heating of the sensing element.

As noted above, the sense current level for a pulsed sense current may be higher than the sense current level for a continuous sense current. For example, a continuous sense current may operate at a sense current level less than about 5 A. By comparison, the sense current level for a pulsed sense current can be upwards of about 100 A in some applications.

The sense current level for the pulsed sense current may also depend on the duty cycle of the sense current pulses. For example, a pulsed sense current may operate with a sense current level between about 10 A to 100 A for a low duty cycle (e.g. less than 1%). The pulsed sense current can have a lower sense current level as the duty cycle increases.

At 320, a measured sensing element resistance of the sensing element can be determined in response to the sense current applied at 310. The measured sensing element resistance can be determined by measuring a voltage drop across the sensing element as the sense current is applied. The measured sensing element resistance can then be determined based on the applied sense current (either the current level output from the current source or a measured sense current value) and the measured voltage drop.

At 330, the temperature at the sensing location can be determined based on the measured sensing element resistance from 320. The $MoSi_2$ sensing element can be manufactured with a known relationship between its resistivity and temperature. Accordingly, the temperature of the sensing location can be determined based on the measured sensing element resistance and the correspondence between the temperature of the sensing element and its resistivity.

The controller may be configured to store a temperature mapping for the sensing element. The temperature mapping may enable the temperature of the sensing location to be determined directly from the measured sensing element resistance. For example, the controller may store a look-up table that maps different sensing element resistance values into temperature values.

Optionally, the controller may be configured to determine the temperature at the sensing location based on the absolute sensing element resistance. Alternatively, the controller may be configured to determine the temperature at the sensing location based on a comparison of the measured sensing element resistance and a calibration sensing element resistance. For example, the controller may be configured to determine the temperature based on a ratio of the resistance of the sensing element in response to the sense current and a calibration sensing element resistance.

The calibration sensing element resistance can be determined for each sensing element during an initial calibration process. The calibration sensing element resistance can then be stored by the controller to enable the temperature to be determined based on the resistance of that particular sensing element. This may further increase the precision of the temperature sensing system by minimizing the impact of manufacturing tolerances for the sensing element itself. This may also allow tolerance requirements to be relaxed or even removed, further reducing the cost of the sensing system.

For example, the calibration sensing element resistance can be determined by applying a calibration sense current pulse to the sensing element while the sensing element is maintained at a calibration temperature. Various different calibration temperatures may be used, such as room temperature (e.g. 20 degrees) for example. The calibration sensing element resistance can then be stored for later reference by the controller when determining the temperature of the sensing location.

The calibration sensing element resistance can be determined during installation of the sensing element at the sensing location. This may ensure that the calibration sensing element resistance reflects the properties of the sensing element as it is installed for use.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples but should be given the broadest interpretation consistent with the description as a whole.

The invention claimed is:

1. A temperature sensor system comprising:
   a molybdenum di-silicide sensing element positioned at a sensing location;
   a current source electrically connected to the sensing element; and
   a controller configured to control a sense current output by the current source and to determine a temperature at the sensing location based on a resistance of the sensing element in response to the sense current;
   wherein
   the controller is configured to determine the temperature based on a ratio of the resistance of the sensing element in response to the sense current and a calibration sensing element resistance; and
   the calibration sensing element resistance is determined by applying a calibration sense current pulse to the sensing element while the sensing element is maintained at a calibration temperature.

2. The system of claim 1, wherein the controller is configured to define the sense current output as a sense current pulse.

3. The system of claim 1, further comprising a voltage sensor coupled across the sensing element, wherein the controller is configured to determine the resistance of the sensing element based on a measured sensing element voltage detected by the voltage sensor.

4. The system of claim 3, further comprising a current sensor operable to detect a current level of the sense current passing through the sensing element, wherein the controller is configured to determine the resistance of the sensing element based on the sensing element voltage drop and the current level.

5. The system of claim 3, wherein:
   the sensing element comprises a sensing element input and a sensing element output;
   the sensing element input is coupled to a first input terminal and a second input terminal, the first input terminal is coupled to the current source and the second input terminal is coupled to a first voltage sensor terminal of the voltage sensor; and the sensing element output is coupled to a first output terminal and a second output terminal, the first output terminal is coupled to the current source and the second output terminal is coupled to a second voltage sensor terminal of the voltage sensor.

6. The system of claim 1, wherein the sensing element is a U-shaped sensing element.

7. The system of claim 1, wherein the sensing element is arranged in a vertical orientation at the sensing location.

8. The system of claim 1, wherein the calibration sensing element resistance is determined during installation of the sensing element at the sensing location.

9. A temperature sensor system comprising:

a molybdenum di-silicide sensing element positioned at a sensing location;

a current source electrically connected to the sensing element; and a controller configured to control a sense current output by the current source and to determine a temperature at the sensing location based on a resistance of the sensing element in response to the sense current; wherein the controller is configured to cause the current source to emit the sense current pulse with a pulse frequency in a range between 1 pulse per minute to 20 pulses per minute.

10. The system of claim 9, wherein the controller is configured to determine the temperature based on a ratio of the resistance of the sensing element in response to the sense current and a calibration sensing element resistance.

11. The system of claim 10, wherein the calibration sensing element resistance is determined by applying a calibration sense current pulse to the sensing element while the sensing element is maintained at a calibration temperature.

12. The system of claim 11, wherein the calibration sensing element resistance is determined during installation of the sensing element at the sensing location.

13. The system of claim 9, wherein the sensing element is arranged in a vertical orientation at the sensing location.

14. A temperature sensing method comprising:

applying a sense current to a Molybdenum Di-Silicide sensing element positioned at a sensing location;

determining a measured sensing element resistance of the sensing element in response to the sense current; and determining a temperature at the sensing location based on the measured sensing element resistance, wherein the temperature is determined based on a ratio of the measured sensing element resistance and a calibration sensing element resistance; and the calibration sensing element resistance is determined by applying a calibration sense current pulse to the sensing element while the sensing element is maintained at a calibration temperature.

15. The method of claim 14, wherein applying the sense current comprises emitting a sense current pulse.

16. The method of claim 14, wherein the calibration sensing element resistance is determined during installation of the sensing element at the sensing location.

17. A temperature sensing method comprising:

applying a sense current to a Molybdenum Di-Silicide sensing element positioned at a sensing location;

determining a measured sensing element resistance of the sensing element in response to the sense current; and determining a temperature at the sensing location based on the measured sensing element resistance;

wherein applying the sense current comprises emitting a sense current pulse; and the sense current pulse is applied with a pulse frequency in a range between 1 pulse per minute to 20 pulses per minute.

18. The method of claim 17, wherein the temperature is determined based on a ratio of the measured sensing element resistance and a calibration sensing element resistance.

19. The method of claim 18, wherein the calibration sensing element resistance is determined by applying a calibration sense current pulse to the sensing element while the sensing element is maintained at a calibration temperature.

20. The method of claim 19, wherein the calibration sensing element resistance is determined during installation of the sensing element at the sensing location.

* * * * *